United States Patent
Torigoe et al.

(10) Patent No.: US 7,865,821 B2
(45) Date of Patent: Jan. 4, 2011

(54) ELECTRONIC DOCUMENT UPDATE NOTIFICATION DEVICE AND ELECTRONIC DOCUMENT UPDATE NOTIFYING METHOD

(75) Inventors: Shin Torigoe, Osaka (JP); Satoshi Ikada, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 971 days.

(21) Appl. No.: 11/715,326

(22) Filed: Mar. 8, 2007

(65) Prior Publication Data

US 2007/0277091 A1 Nov. 29, 2007

(30) Foreign Application Priority Data

May 26, 2006 (JP) .............................. 2006-147409

(51) Int. Cl.
 G06F 15/00 (2006.01)
 G06F 15/16 (2006.01)
(52) U.S. Cl. ........................ 715/234; 715/205; 715/255; 715/760; 709/203; 709/217; 707/602; 707/706
(58) Field of Classification Search ................. 715/200, 715/201, 204, 205, 207, 208, 234, 253, 254, 715/255, 256, 273, 700, 752, 753, 760, 861; 709/201, 202, 203, 204, 205, 206, 207, 217, 709/218, 219; 707/602, 705, 706, 709, 713, 707/804, 805
See application file for complete search history.

(56) References Cited

U.S. PATENT DOCUMENTS

| | | | | |
|---|---|---|---|---|
| 6,065,044 A * | 5/2000 | Ogasawara | ................. | 709/207 |
| 6,205,478 B1 * | 3/2001 | Sugano et al. | ............... | 709/223 |
| 7,103,353 B2 * | 9/2006 | Suzuki | ..................... | 455/414.2 |
| 2002/0004402 A1 * | 1/2002 | Suzuki | ....................... | 455/456 |
| 2004/0059824 A1 * | 3/2004 | Nishio et al. | ................. | 709/230 |

(Continued)

FOREIGN PATENT DOCUMENTS

JP 2005-025620 1/2005

(Continued)

OTHER PUBLICATIONS

Y. Nakai et al., "Monitoring Partial Updates in Web Pages Using Relational Learning", Springer Berlin / Heidelberg, 2002, pp. 452-455.*

(Continued)

*Primary Examiner*—Laurie Ries
*Assistant Examiner*—Maikhanh Nguyen
(74) *Attorney, Agent, or Firm*—Rabin & Berdo, P.C.

(57) ABSTRACT

This invention provides an electronic document update notification device for notifying a user of update information of an electronic document including: a updated document name generating part 170 for generating a updated document name based on a stylized document name; a document data obtaining part 150 for obtaining document data after update based on the updated document name; a difference extracting part 180 for extracting difference data between document data before update and the document data after update; and an update information creating part 190 for creating an update information notification based on the difference data. This makes it possible to notify a user of the update information of the electronic document even when a document after update is created with the document name with the document name before update changed according to a predetermined rule, at the time of update of the electronic document.

10 Claims, 8 Drawing Sheets

U.S. PATENT DOCUMENTS

| | | | |
|---|---|---|---|
| 2004/0078464 A1* | 4/2004 | Rajan et al. | 709/224 |
| 2005/0050460 A1* | 3/2005 | Bedingfield, Sr. | 715/513 |
| 2005/0108363 A1* | 5/2005 | Torigoe et al. | 709/218 |
| 2005/0119910 A1* | 6/2005 | Schneider | 705/1 |

OTHER PUBLICATIONS

B. Rahardjo et al., "Automatic Information Extraction from Web Pages", Proceedings of the 24th annual international ACM SIGIR conference on Research and development in information retrieval. ACM, 2001, pp. 430-431.*

W. Warner, "Development of a Web Bookmark Management System with Notification of Web Pages Changes", BSc in Computer Science, May 12, 2004, 217 pages.*

S. Flesca et al., "Efficient and Effective Web Change Detection", Data & Knowledge Engineering, vol. 46, Issue 2, Aug. 2003, pp. 203-224.*

* cited by examiner

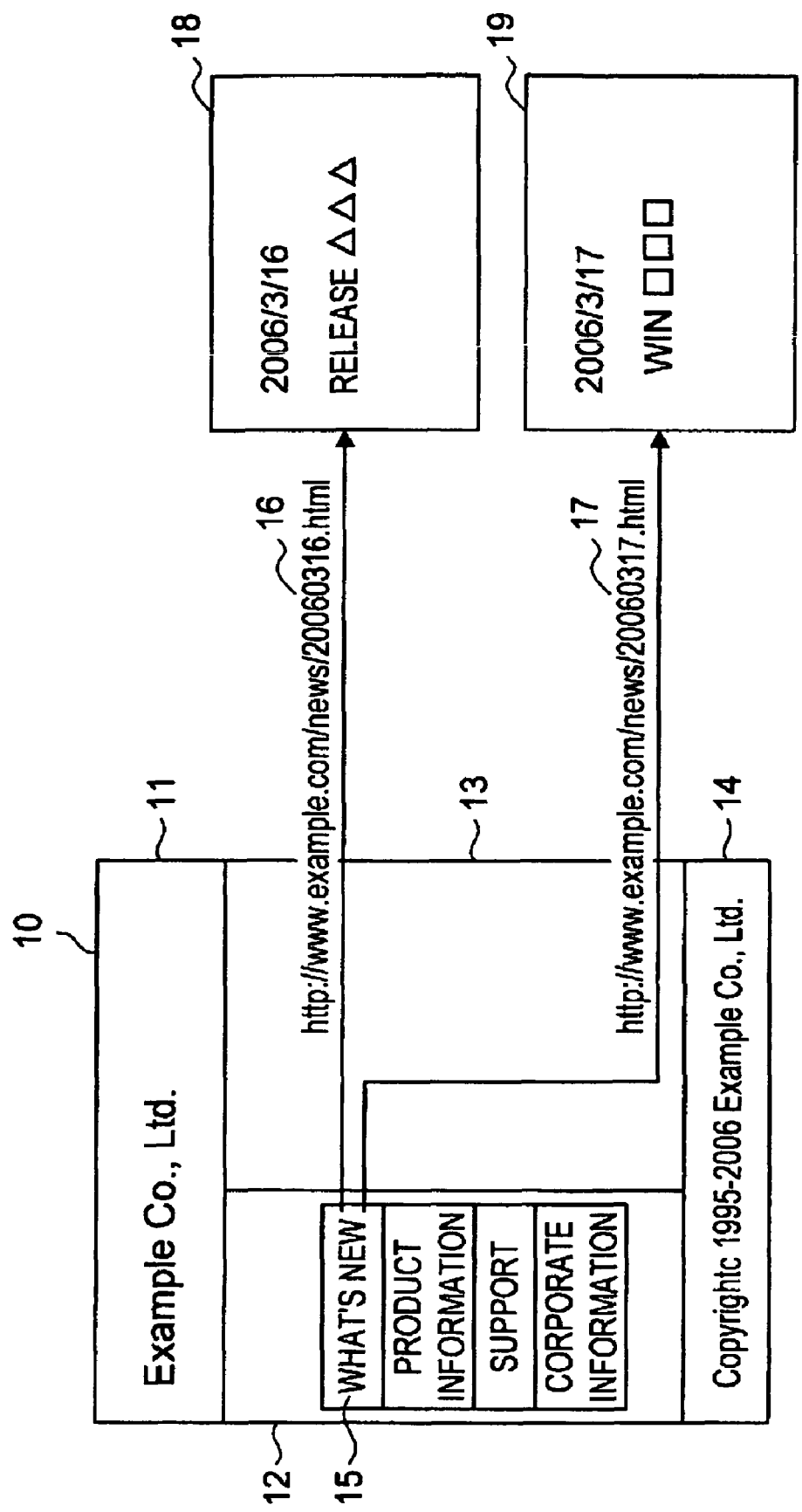

ELECTRONIC DOCUMENT UPDATE NOTIFICATION DEVICE AND ELECTRONIC DOCUMENT UPDATE NOTIFYING METHOD

CROSS-REFERENCE TO RELATED APPLICATION

The disclosure of Japanese Patent Application No. JP2006-147409 filed on May 26, 2006, entitled "ELECTRONIC DOCUMENT UPDATE NOTIFICATION DEVICE AND ELECTRONIC DOCUMENT UPDATE NOTIFYING METHOD". The contents of that application are incorporated herein by reference in their entirety.

BACKGROUND OF THE INVENTION

1. Field of the Invention

The present invention relates to an electronic document update notification device and an electronic document update notifying method. More specifically, the present invention relates to an electronic document update notification device and an electronic document update notifying method for notifying a user of the update contents of the electronic document.

2. Description of the Related Art

There is known a system for monitoring the update of electronic document on a file server or a web site and for notifying a user of the update thereof. Using such a system makes it possible for a user to know the update of information without confirming the update by accessing the Web site and to reduce the load of confirming the update.

In the notifying method disclosed in Japanese Patent Laid-open Publication No. 2005-25620 (hereafter, referred to as patent document 1), for example, the data of the document file specified by a user is collected according to an arbitrary schedule to notify the user of the update information of the file. According to this notifying method, the name of file is identified as an identifier in the document file and difference data is created by comparing the data before update with the data after update in the same document. With such difference data, the URL, etc. for displaying the number of the updated parts, the outline of the updated part or the updated part are notified the user.

With the notifying method in the patent document 1, since the file name is used as the identifier of the document file, the update notification cannot be received in the case, for example, where the file after update is created with another name by indicating the update file name by the date of update.

The example in such a case is described by using a display example of the Web page in FIG. 8. FIG. 8 is an explanatory diagram describing the conventional electronic document update notifying method and shows an example of display screen of the case where a top page 10 of the Web site of a certain company is displayed with a browser. The top page 10 includes: a header field 11 for displaying the title of the Web site; a menu field 12 for displaying a menu; a main field 13 for displaying the contents of the item selected from the menu; and a footer field 14 including the copyright notice, etc. of the Web site.

In the menu displayed in the menu field 12, a link is provided for an HTML (Hyper Text Markup Language) file with the contents of each menu described. A user can have the HTML file of the link displayed in the main field 13 by moving a mouse cursor to a string of the menu to be selected and clicking the button.

In a menu 15 for displaying "What's New", for example, an URL (Uniform Resource Locator) 16 indicated as a link is specified. A file 18 shows the contents of the HTML file in the URL 16 and the contents of the file 18 are displayed in the main field 13 by selecting the menu 15. In addition, a file name "20060316.html" of the file 18 indicates the date of update and shows that the file 18 was updated on Mar. 16, 2006.

An URL 17 is the URL of the file after update of the file 18 and a file 19 shows the contents of the file after update. The file 19 was updated on Mar. 17, 2006 as shown by the file name "20060317.html" in the URL 17.

With the method according to the patent document 1, when the update information of such a Web site is desired to be confirmed, the update information cannot be received since the registered URL 16 is different from the URL 17 of the file after update even if the URL 16 is registered as the notified party of the update notification.

SUMMARY OF THE INVENTION

The present invention has been achieved in view of the aforementioned problems. An object of the present invention is to provide a novel and improved electronic document update notification device and electronic document update notifying method capable of notifying a user of the update information even when a document after update is created with the document name with the document name before update changed according to a predetermined rule, at the time of update of the electronic document.

To solve the problems, according to an aspect of the present invention, there is provided an electronic document update notification device for notifying a user of update information of an electronic document including: a updated document name generating part for generating a updated document name based on a stylized document name; a document data obtaining part for obtaining document data after update based on the updated document name; a difference extracting part for extracting difference data between document data before update obtained at the time of previous update notification and the document data after update; and an update information creating part for creating an update information notification based on the difference data.

With such a configuration, even when the document name of the document whose update information should be notified is changed at the time of update of the document according to a predetermined rule, the document after update can be identified to obtain the update information.

In addition, the electronic document update notification device may further include a document name stylizing part for stylizing a notification object document name designated by a user as a notification object document. Thereby the user can receive the update information without registering the notification object document name again.

Also, the document name stylizing part may stylize a string indicating date and time included in the notification object document name. Thereby the update can be notified even in the case where the update notification object document name is shown including the date and time and even in the case of creating the updated document with the document name in which the date and time are changed at the time of update.

In addition, the document name stylizing part may create a plurality of stylization candidates for date and time and may check whether there is a part matching any of the stylization candidates in the notification object document name. Since there are a plurality of patterns as the format pattern of date and time, the part corresponding to date and time can be detected with such a configuration whichever pattern the date and time included in the document name are indicated by.

As the result of checking, the stylized document name may be created by replacing the matching part by the stylization candidates. Thereby when there are a plurality of matching parts, the candidates of the stylized document name can be presented to the user and the user can select the intended document name among the presented candidates of stylized document name.

In addition, the document name stylizing part may stylize the document name with the form including expression, etc. Thereby there can be stylized the document name changed based on the value defined by a predetermined expression.

The stylized document name may be specified by a user's input. Thereby the step of stylizing the document name can be omitted to avoid the stylizing of the document name with the form that the user does not intend.

The update information notification may be created including both the registered document name and the updated document name. Thereby even when the user specifies the document name with the stylized form, there can be identified the name of the updated document supporting the update information actually notified. Also, showing two document names makes it possible to confirm whether the document name specified by the user or the updated document name is correct.

The update information notification may be created by template, which makes it possible to create the notifications with different forms automatically according to the object document or user.

Also, to solve the problems, according to another aspect of the present invention, there is provided an electronic document update notifying method for notifying a user of update information of an electronic document including: a updated document name generating step for generating a updated document name based on a stylized document name; a document data obtaining step for obtaining document data after update based on the updated document name; a difference extracting step for extracting difference data between document data before update obtained at the time of previous update notification and the document data after update; and an update information creating step for creating an update information notification based on the difference data.

With such a configuration, even when the document name of the document whose update information should be notified is changed at the time of update of the document according to a predetermined rule, the document after update can be identified to obtain the update information.

The electronic document update notifying method may further include a document name stylizing step for stylizing a notification object document name designated by a user as a notification object document. Thereby the user can receive the update information without registering the notification object document name again.

The document name stylizing step may stylize a string indicating date and time included in the notification object document name. Thereby the update can be notified even in the case where the update notification object document name is shown including the date and time and even in the case of creating the updated document with the document name in which the date and time are changed at the time of update.

The document name stylizing step may include the steps of: creating a plurality of stylization candidates for date and time; checking whether there is a part matching any of the stylization candidates in the notification object document name; and replacing the matching part by the stylization candidates.

Since there are a plurality of patterns as the format pattern of date and time, the part corresponding to date and time can be detected with such a configuration whichever pattern the date and time included in the document name are indicated by. Further when there are a plurality of candidates of stylized document name, these candidates can be presented to the user and the user can select the intended document name among the presented candidates of stylized document name.

In the document name stylizing step, in addition, the document name may be stylized by including a predetermined expression. Thereby there can be stylized the document name changed based on the value defined by a predetermined expression.

The stylized document name may be specified by a user's input. Thereby the step of stylizing the document name can be omitted to avoid the stylizing of the document name with the form that the user does not intend.

The update information notification may be created including both the registered document name and the updated document name. Thereby even when the user specifies the document name with the stylized form, there can be identified the name of the updated document supporting the update information actually notified. Also, showing two document names makes it possible to confirm whether the document name specified by the user or the updated document name is correct.

The update information notification may be created by template, which makes it possible to create the notifications with different forms automatically according to the object document or user.

According to the present invention as described above, a user can be notified of the update information even when a document after update is created with the document name with the document name before update changed according to a predetermined rule, at the time of update of the document.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIG. 8 is an explanatory diagram for describing a conventional electronic document update notifying method.

DETAILED DESCRIPTION OF THE PREFERRED EMBODIMENTS

Figure 1:
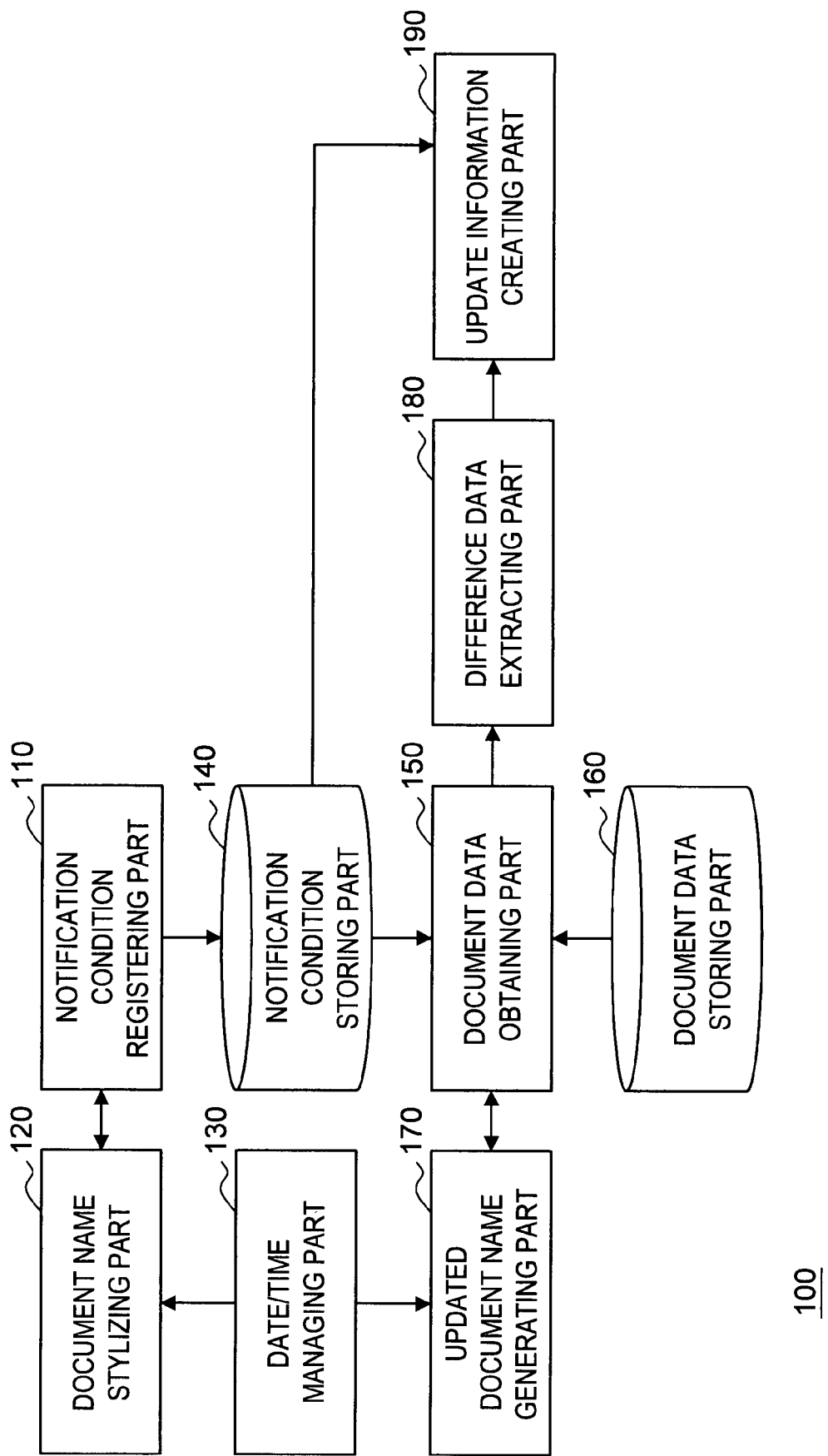
FIG. 1 is a block diagram showing a schematic configuration of an electronic document update notification device.

Hereinafter, the preferred embodiment of the present invention will be described in reference to the accompanying drawings. Same reference numerals are attached to components having same functions in following description and the accompanying drawings, and a description thereof is omitted.

First, there will be described an electronic document update notification device according to an embodiment of the present invention in reference to FIG. 1. FIG. 1 is a block diagram showing a schematic configuration of an electronic document update notification device according to an embodiment of the present invention.

An electronic document update notification device 100 according to this embodiment is, for example, a device for notifying a user of the update contents of a document in an URL of a Web page in the case of including a string indicating update date and time in the URL and changing the URL with the update of the page. As shown in FIG. 1, the electronic document update notification device 100 is configured by: a notification condition registering part 110; a document name stylizing part 120; a date/time managing part 130; a notification condition storing part 140; a document data obtaining part 150; a document data storing part 160; a updated document name generating part 170; a difference data extracting part 180; and an update information creating part 190.

Figure 2:
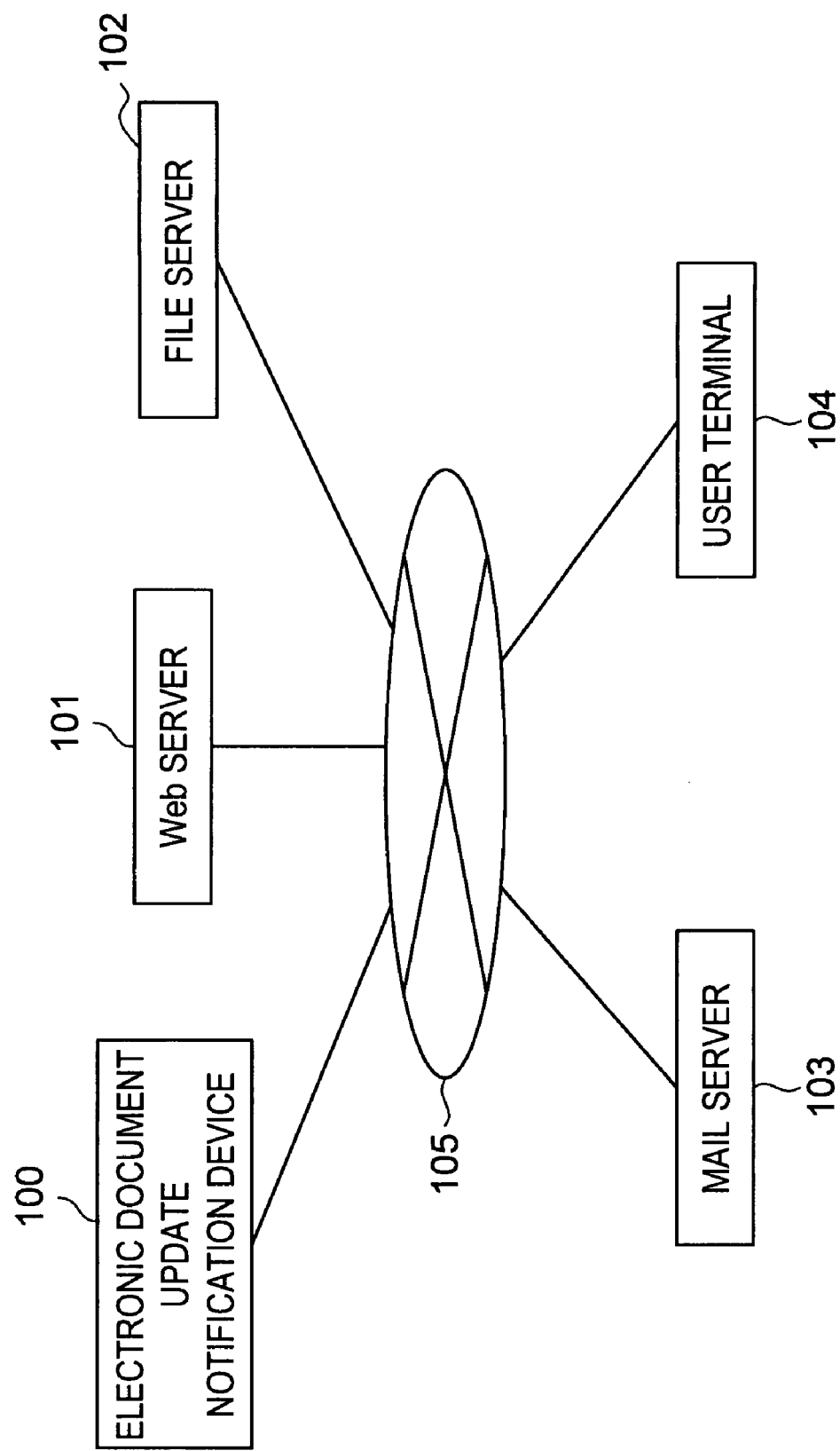
FIG. 2 is a block diagram showing a system configuration of the electronic document update notification device.

FIG. 2 is a block diagram showing a utilization example of the electronic document update notification device 100 according to this embodiment. As shown in FIG. 2, the electronic document update notification device 100 is connected to a network 105. The network 105 includes, for example, the Internet or LAN (Local Area Network). Further, the electronic document update notification device 100 is configured to be capable of communicating with a Web server 101, a file server 102, a mail server 103 and a user terminal 104 via the network 105.

The Web server 101 and the file server 102 are information processors including a storage medium in which there is stored an electronic document whose update is to be notified. The electronic document update notification device 100 obtains electric document data corresponding to the document name specified by a user from the Web server 101 and the file server 102 via the network 105. The mail server 103 is used for sending a mail to the user when the electronic document update notification device 100 notifies the user of the update information via an e-mail. The mail for notifying of the update information sent from the electronic document update notification device 100 reaches the mail server 103 corresponding to the user's e-mail address via the network 105. The user terminal 104 is an information processor such as personal computer used by a user. The user registers the update notification object document name in the electronic document update notification device 100 from the user terminal 104 via the network 105 and receives the e-mail for notifying of the update information from the mail server 103.

Although there may be a plurality of electronic document update notification devices 100, Web servers 101, file servers 102, mail servers 103 and user terminals 104, there will be described assuming that each of them exists one by one to simplify the description.

Next, each part of the electronic document update notification device 100 will be described.

The notification condition registering part 110 is an operation part for storing the document name of the update notification object document and the notified party of the update information that are input by the user via the user terminal 104, in the notification condition storing part 140. The document name to be input includes, for example, file name of document or URL. The notified party includes generally e-mail address and may also include phone number or fax number.

The document name is stored in the notification condition storing part 140 with the form of document name in which the string corresponding to date and time in the document name is stylized in a predetermined format (hereafter, referred to as stylized document name). For this, the notification condition registering part 110 inputs the input document name in the document name stylizing part 120 to request the stylization process. Or, an input interface may be provided so that the user can input the stylized document name directly at the time of input and the notification condition registering part 110 may store the input stylized document name in the notification condition storing part 140 as it is.

The document name stylizing part 120 is an operation part for searching the string indicating date and time from the document name input from the notification condition registering part 110 and creating the document name with the part of date and time stylized when there is the corresponding part. More specifically, first the document name stylizing part 120 obtains the current date and time at the time of process from the date/time managing part 130 to create a date/time string with the obtained current date and time changed into string in a predetermined format. Then the document name stylizing part 120 checks whether there is a part matching the created date/time string from the document name input from the notification condition registering part 110, creates the document name with the date and time stylized when there is the matching part, and returns the stylized document name to the notification condition registering part 110.

Figure 3:
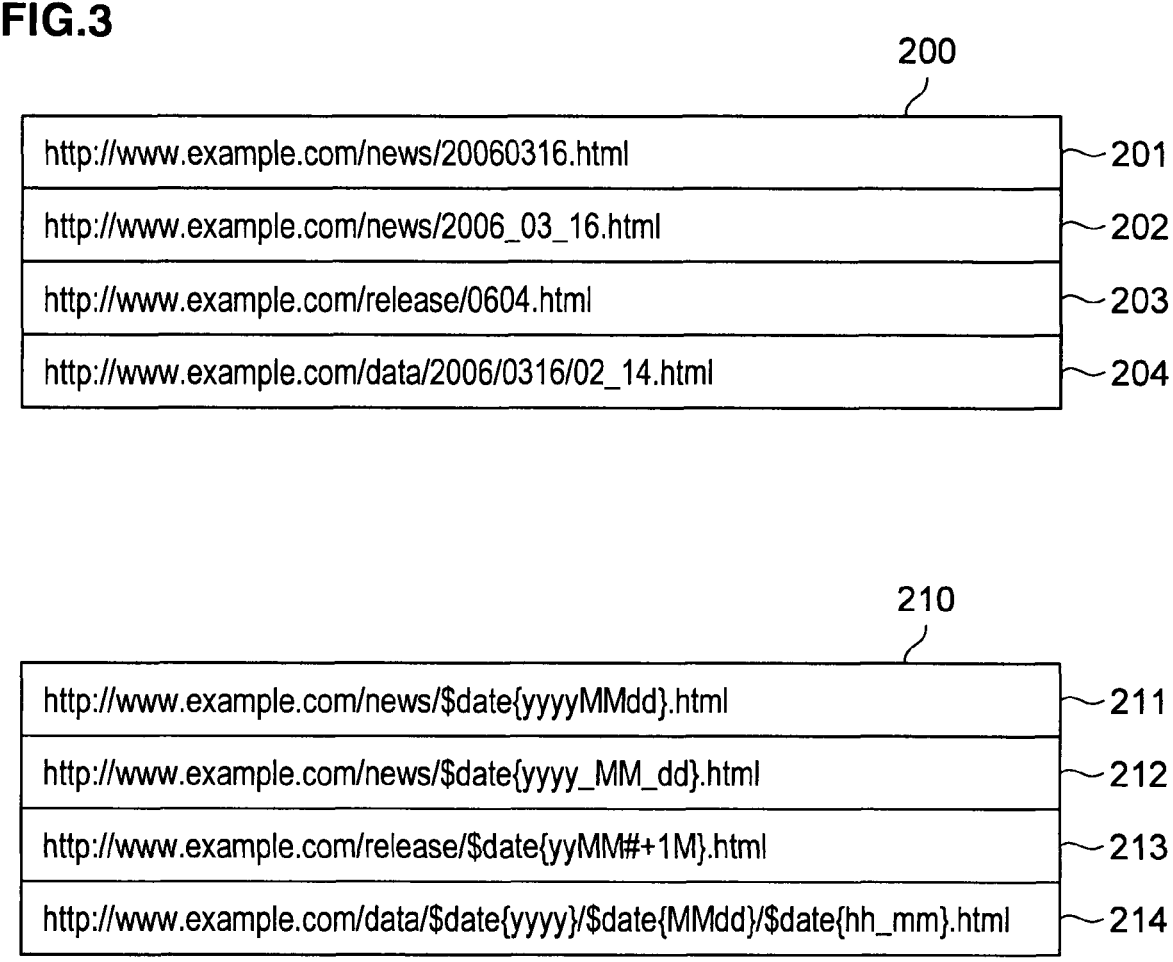
FIG. 3 is an explanatory diagram showing an example of a document name stylized in a document name stylizing part.

An example of document name stylized in the document name stylizing part 120 will be described in reference to FIG. 3. FIG. 3 is an explanatory diagram showing an example of the document name stylized in the document name stylizing part 120. URLs 211-214 included in a document name list 210 indicate the document names in which URLs 201-204 included in a document name list 200 are stylized. In addition, "$date" in the URLs 211-214 are variables indicating date and time. The alphabets in the brace { } following "$date" indicate the format of date and time, and "yyyy", "MM", "dd", "hh" and "mm" indicate year, month, day hour and minute, respectively.

In the URL 201 "http://www.example.com/news/20060316.html", for example, the part "20060316" corresponds to the string indicating date. Therefore, the URL with the URL 201 stylized is represented by "http://www.example.com/news/$date{yyyyMMdd}.html" in which the part "20060316" is replaced by the variable "$date" indicating date and by the string "{yyyyMMdd}" indicating the format of date, as shown by the URL 211.

The URL 213 shows an example of stylization with the form including an expression. In the URL 213, the format of date is defined as "{yyMM#+1M}". Here, "yy" indicates the last two digits of year and "MM" indicates month. "#1" indicates symbol of operation "+" and indicates "add 1 to the value of month" with "1M".

Further as shown in the URLs 201-204, there are a plurality of patterns of the format of strings indicating date and time. For example, "Mar. 16, 2006" is indicated as "20060316" in the URL 201 and as "2006_03_16" in the URL 202. Other than these, there can be assumed various patterns such as a form "0603" with date and time omitted and a form "2006/0316/02_14" including time as well, as shown by the URLs 203 and 204. In the document name stylizing part 120, there are created stylization candidates for date and time in which the obtained current date and time are represented by each pattern and it is checked whether there is a candidate included in the document name among these candidates, so as to support any of these patterns.

As the result of checking, when there are no parts matching the stylization candidates for date and time in the document name, the document name stylizing part 120 notifies the notification condition registering part 110 of the failure of stylization. When there is only one matching part, the document name stylizing part 120 creates the stylized document name in which the matching part is replaced by the above variable and by the format pattern to return to the notification condition registering part 110. When there are two or more matching parts, the document name stylizing part 120 creates the candidates of the stylized document name stylized for the matching parts and notifies the user so as for the user to select one of the candidates of the stylized document name notified. When the user has selected one, the document name stylizing part 120 returns the selected stylized document name to the notification condition registering part 110. When a predetermined time has passed without selection or when the selection has been canceled, the registration may be ended.

The date/time managing part 130 is an operation part for managing current date and time and outputs the current date and time in response to an inquiry of the current date and time. The date/time managing part 130 is configured by, for example, hardware having clock function for holding current time and built in an information processor such as server.

The notification condition storing part 140 is a storage part for storing the notified party stored by the notification condition registering part 110. The contents of data stored in the notification condition storing part 140 are shown in FIG. 4.

Figure 4:
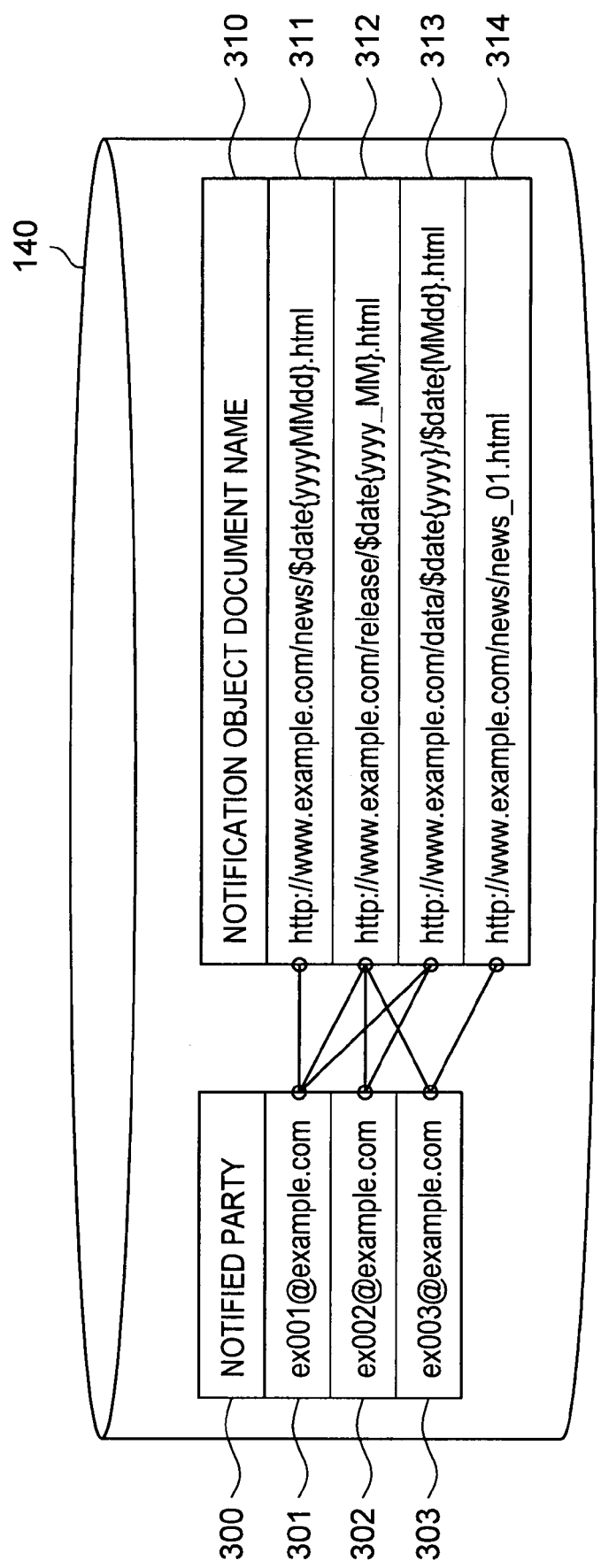
FIG. 4 is a block diagram showing a data configuration of data to be stored in a notification condition storing part.

FIG. 4 is a block diagram showing a data configuration of data to be stored in the notification condition storing part 140. In the notification condition storing part 140, as shown in FIG. 4, a notified party 300 and a notification object document name 310 are stored. In the notified party 300, e-mail addresses 301-303 are registered. The information registered in the notified party 300 includes generally e-mail address and may also include phone number or fax number. When the document name stylizing part 120 has succeeded in the stylization of document name or when the stylized document name is input directly by the user, stylized document names 311-313 are stored in the notification object document name 310. When the document name stylizing part 120 could not stylize the document name, the document name input by the user such as a document name 314 is stored in the notification object document name 310 as it is.

The notified party 300 and the notification object document name 310 are correlated with each other and the notified party 300 indicates the notified party of which the update information of the document indicated by the notification object document name 310 is notified. One or plural notification object document names 310 may be correlated with one notified party 300. On the contrary, one or plural notified parties 300 may be correlated with one notification object document name 310. With such a correlation, the notification object document name 310 correlated to the notified party 300 can be obtained from the notified party. On the contrary, the notified party 300 correlated with the notification object document name 310 can be obtained from the notification object document name. For example, the document names 311-313 are correlated with the e-mail address 301, by which it can be clarified that the e-mail address 301 is notified of the update information of the electronic documents correlated to the document names 311-313.

The document data obtaining part 150 is an operation part for obtaining the document data of the notification object document before update and the document data thereof after update to request the difference data extracting part 180 to extract the update contents. The document data before update is obtained from the document data storing part 160 based on the document name stored in the notification condition storing part 140. The document data after update is obtained from the Web server 101, the file server 102 and so on via the network 105. When the document name stored in the notification condition storing part 140 is the stylized document name, the document data obtaining part 150 requests the updated document name generating part 170 to generate the updated document name to obtain the document data after update based on the generated document name. When the registered document name is not the stylized document name, the document data obtaining part 150 obtains the document data by using the document name. When the document data obtaining part 150 succeeds in obtaining the document data after update, the document data obtaining part 150 stores the obtained document data in the document data storing part 160. The stored document data is used for the extraction of the update contents as the document data before update at the time of the next notification of the update information.

The document data storing part 160 is a memory unit for storing the document data obtained by the document data obtaining part 150 at the time of notification of the update information. The data stored in the document data storing part 160 is used as backup data for extracting the update contents by comparing with the document data after update at the time of the next notification of the update information. Also, the stored document data is stored correlated with the notification object document name in the notification condition storing part 140 so as to be specified by the notification object document name stored in the notification condition storing part 140. In storing the document data, new data may be stored by deleting or overwriting the document data stored last or new data may be added keeping the last data stored.

The updated document name generating part 170 generates an actual document name of the document after update from the stylized document name in response to the request for the generation of the document name from the document data obtaining part 150, to which the generated document name is returned. More specifically, the updated document name generating part 170 first obtains the current date and time at the time of process from the date/time managing part 130. Next, the updated document name generating part 170 changes the obtained current date and time into string by the format of the date and time specified as the stylized document name to generate the updated document name. For example, when the stylized document name input from the document data obtaining part 150 is the document name 311 "http://www.example.com/news/$date{yyyyMMdd}.html" shown in FIG. 3 and the obtained current date is "Mar. 17, 2006", the generated document name is "http://www.example.com/news/20060317.html".

The difference data extracting part 180 extracts the difference data by comparing the document data before update and the document data after update that have been input from the document data obtaining part 150. The difference data includes the information such as: distinction of the contents of the change of data falling under changing, addition or deletion; data of the changed part before and after update; data deleted or added; and line number specifying the changed part. The created difference data is input to the update information creating part 190. When there is no change of the document data, the difference data extracting part 180 may output blank difference data or notify the update information creating part 190 of the fact that the difference data is not created.

The update information creating part 190 creates the update information notification based on the difference data created in the difference data extracting part 180. The created update information notification is sent to the notified party stored in the notification condition storing part 140. When the document data is not updated and the difference data is blank, or when the difference data is not created, the update information creating part 190 may notify the user of the fact that the update has not been carried out. Or, when there is no update, there may be configured that the notification is not sent to the user. In addition, when there is no update the user may select at the time of registration of the notification object document whether the notification is sent to the user or not.

Figure 5:
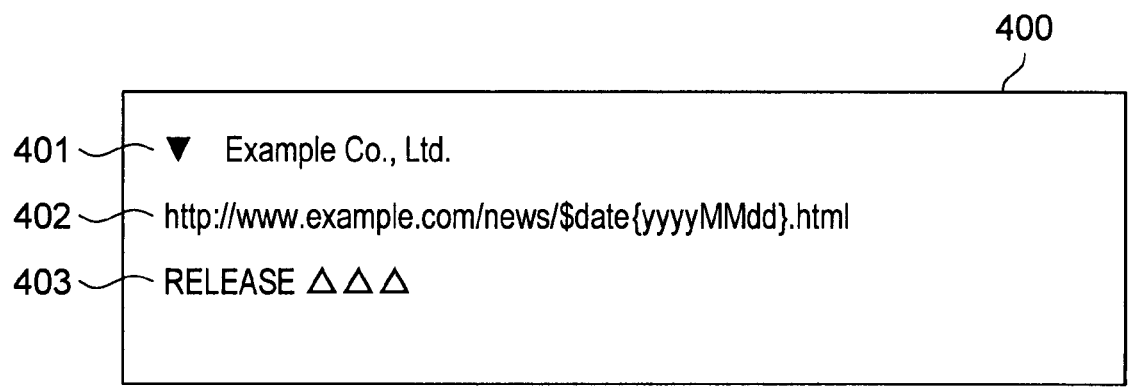
FIG. 5 is an explanatory diagram showing an example of an update information notification created in an update information creating part.
Figure 5:
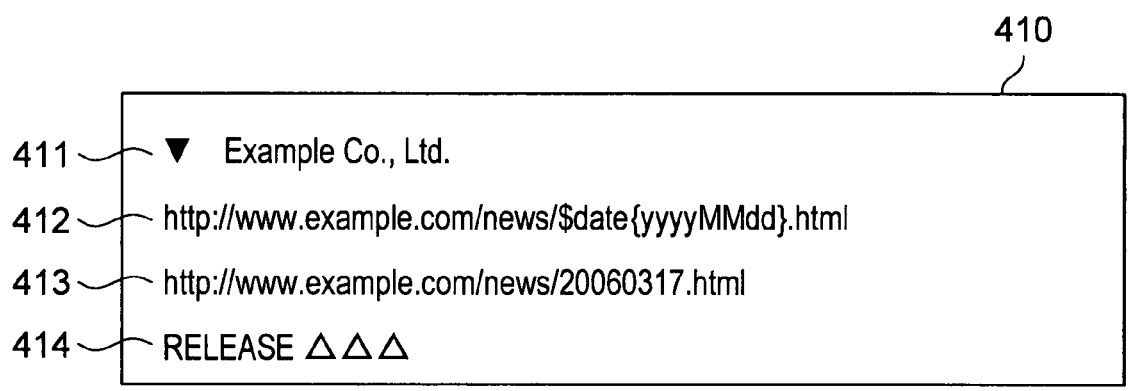

FIG. 5 is an example of the update information notification created in the update information creating part 190 and shows an update information notification 400 to be created in the case of the Web page in FIG. 8. As shown in FIG. 5, the update information notification 400 includes a title 401 of the Web page to be an object, a document name 402 registered and update contents 403.

An update information notification 410 is a modification of 400 and there is described an actual URL 413 of the Web page after update in addition to the contents described in the update information notification 400. As this, the update information notification may be created including the document name of the document after update actually obtained as well as the registered document. Thereby the user can specify the document supporting the update information. Also when the user specifies the notification object document by inputting the stylized document name, it can be confirmed whether the updated document name is correctly generated or not. The contents described in the update information notification are not restricted to the example in FIG. 5 and may include more detailed update information.

The update information notification may be created by template, which may be different according to the document of the update notification object or the notified party to be notified. Thereby it becomes possible to create the notifications with different forms automatically according to user. Also, there may be configured at the time of the registration of the notification object document that the user can specify the template to be used.

The configuration of the electronic document update notification device 100 according to this embodiment has been described as above. It should be noted that there may be configured by a program module which is capable of performing the above-described functions and which is installed in an information processor such as server: the notification condition registering part 110; the document name stylizing part 120; the document data obtaining part 150; the updated document name generating part 170; the difference data extracting part 180; and the update information creating part 190. The date/time managing part 130 may be configured by hardware with clock function for holding current time and built in, for example, a server. The notification condition storing part 140 and the document data storing part 160 may be configured by various storage media such as semiconductor memory, optical disk, and magnetic disk.

Next, there will be described an electronic document update notifying method using the electronic document update notification device 100 thus configured. Hereafter, the electronic document update notifying method according to this embodiment will be described dividing into a notification object registration process and an update information notification process.

Figure 6:
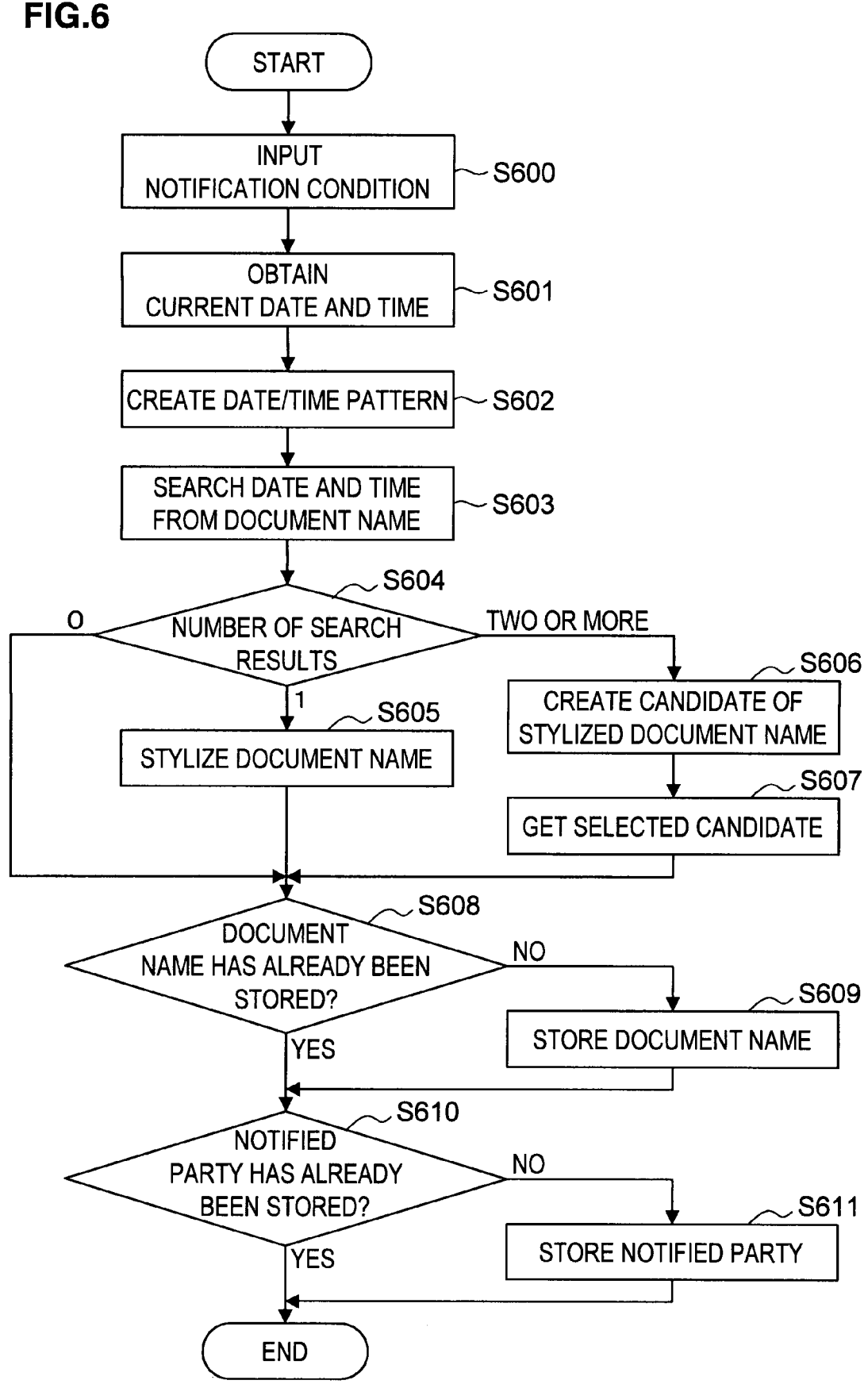
FIG. 6 is a flowchart showing a notification object registration process.

First, there will be described the notification object registration process using the electronic document update notification device 100 according to this embodiment in reference to FIG. 6. FIG. 6 is a flowchart showing the notification object registration process using the electronic document update notification device 100 according to this embodiment.

First in step S600 as shown in FIG. 6, the document name of the notification object document and the notified party thereof are input to the electronic document update notification device 100 by the user. The user can input the document name such as URL of Web page whose update information is desired to be received and such as file name and input the notified party such as e-mail address by using the user terminal 104 connected to the electronic document update notification device 100 via the network 105, and can send to the electronic document update notification device 100 via the network 105.

Next in steps S601-S607, the document name stylizing part 120 stylizes the document name such as URL of the input update notification object.

More specifically, first in step S601, the document name stylizing part 120 obtains the current date and time from the date/time managing part 130. Next in step S602, the document name stylizing part 120 creates the string indicating the obtained current date and time. Here, since there are a plurality of patterns of the strings indicating date and time, there are created the candidates of the strings with the obtained current date and time described by the plurality of patterns so as to support any patterns. In the case of "Mar. 16, 2006", for example, the stings such as "20060316" m "06_03_16" and "2006_03" are created.

Next in step S603 the document name stylizing part 120 searches whether there is a matching part in the document name for all strings created in step S602. In the step S604, the document name stylizing part 120 determine the next process based on the result of searching. When there is no matching part in the document name, the document name is not stylized and the notification condition registering part 110 is notified of the failure of stylization. When there is one part in the document name matching one string, the document name stylizing part 120 creates the stylized document name to notify the notification condition registering part 110 of the created stylized document name in step S605.

When there are a plurality of parts matching any of the strings of date and time, the document name stylizing part 120 creates the stylized document name for the matching parts in step S606. The plurality of stylized document names thus created are sent to the user terminal 104 via the network 105 and there is displayed in the user terminal 104 so that the user can select one among these stylized document names. When the user selects one of the stylized document names, it is sent to the electronic document update notification device 100 which stylized document name has been selected and the notification condition registering part 110 is notified of the selected stylized document name in step S607.

Next in steps S608-S611, the notification condition registering part 110 stores the notification object document name and the notified party in the notification condition storing part 140. The document name to be registered is the stylized document name notified from the document name stylizing part 120. When there fails in the stylization in the document name stylizing part 120, the document name input by the user may be registered.

First in step S608, the notification condition registering part 110 searches whether the document name matching the document name to be registered has already been registered in the notification condition storing part 140. When the document name is not registered, the notification condition registering part 110 stores the document name to be registered in the notification condition storing part 140 in step S609.

Next in step S610, the notification condition registering part 110 searches whether the notified party matching the notified party to be registered has already been registered in notification condition storing part 140. When the notified party is not registered, the notification condition registering part 110 stores the notified party in the notification condition storing part 140 in step S611. At this time, the correlation between the notification object document name and the notified party is performed at the same time.

With the above flow of operation, the registration is repeated until the end of process for all registration data.

The process of registering the notification object has been described in the electronic document update notification device 100 as above. With such a process, the user can register the document whose update information is desired to be notified of. As a result, the update information can be received by the update information notification process described as follows at the time of the update of the document.

Figure 7:
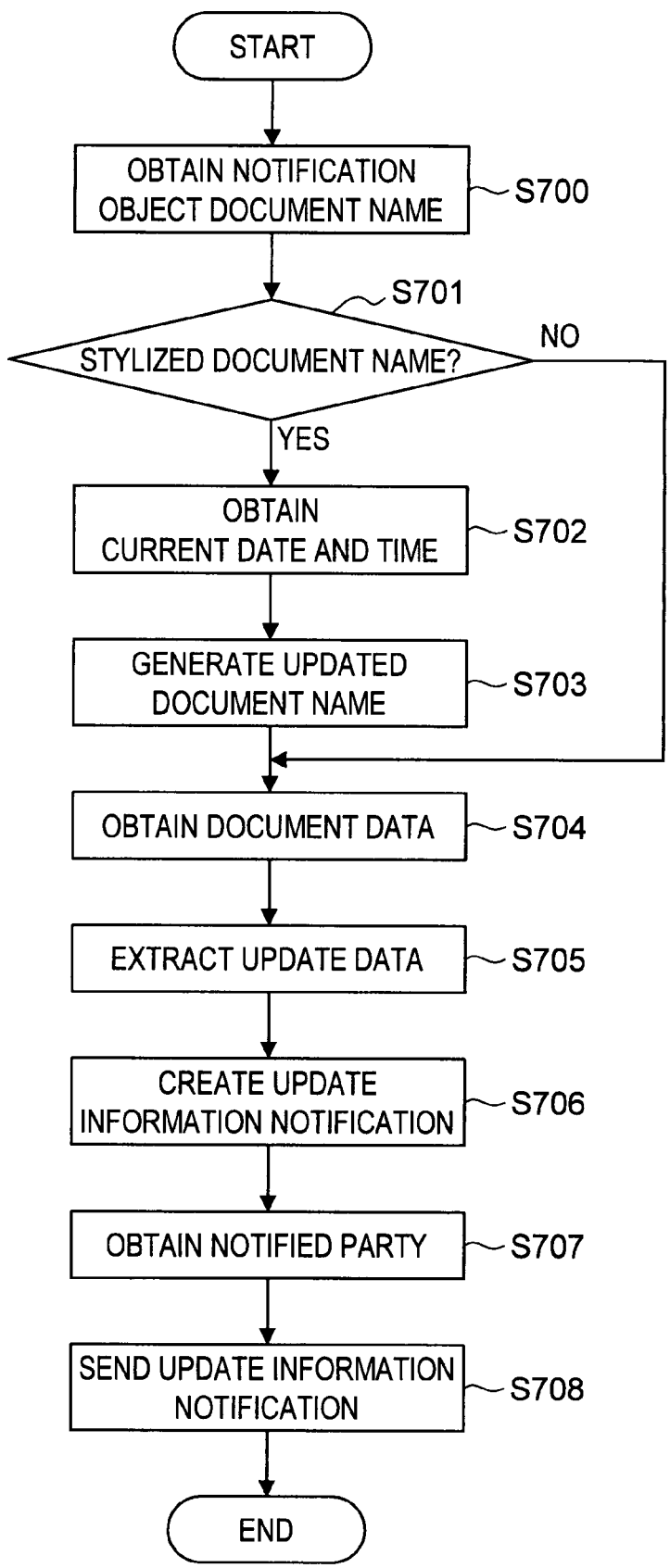
FIG. 7 is a flowchart showing an update information notification process.

Next, there will be described the update information notification process using the electronic document update notification device 100 according to this embodiment in reference to FIG. 7. FIG. 7 is a flowchart showing the update information notification process using the electronic document update notification device 100 according to this embodiment.

The update information notification is initiated according to, for example, a predetermined schedule to extract the update information. In the schedule for initiation, arbitrary day and time may be set at an arbitrary interval such as once a day, once a week or once a month. Or, the schedule may be set according to the notification object document or the notified party. Alternatively, the process may be initiated in response to an external request such as being initiated at the timing of the request for obtaining the update information from the user, instead of the predetermined schedule.

First in step S700 as shown in FIG. 7, the document data obtaining part 150 obtains one or plural notification object document names registered in the notification condition storing part 140.

Next in step S701, the document data obtaining part 150 judges whether the obtained document names are stylized or not. This judgment may be carried out according to whether the predetermined string pattern is included in the stylized document. In the example of the stylized document name in a table 200 of FIG. 3, for example, it can be judged whether the document name is stylized or not by searching whether the variable "$date" indicating date and time is included in the document name.

When the registered document name is the stylized document name, the updated document name generating part 170 generates the updated document name (steps S702 and S703). When the document is not the stylized document, there moves to step S704.

In step S702, the updated document name generating part 170 obtains the current date and time from the date/time managing part 130. Next in step S703, the updated document name generating part 170 generates the document name with the stylized document having the obtained current date and time applied thereto. For example, when the obtained document name is indicated as "http://www.example.com/news/$date{yyyyMMdd}.html" and the obtained current date and time are indicated as "Mar. 17, 2006", the part "$date{yyyyMMdd}" is replaced by the string "20060317" generated by applying the date to the part "$date" indicating the variable of date and to the part "yyyyMMdd" indicating the format of date to generate the document name "http://www.example.com/news/20060317.html".

Next in step S704, the document data obtaining part 150 obtains the document data before update and the document data after update. The document data before update is obtained from the document data storing part 160 based on the document name stored in the notification condition storing part 140. When the document name registered in the notification condition storing part 140 is the stylized document name, the document data after update is obtained from the Web server 101, the file server 102 and so on via the network 105 by using the document name generated in step S703. When the document name stored in the notification condition storing part 140 is not the stylized document name, the document data after update is obtained from the Web server 101, the file server 102 and so on based on the registered document name.

Next in step S705, the difference data extracting part 180 extracts the difference data by comparing the document data before update and the document data after update. The difference data includes the information such as: distinction of the contents of the change of data falling under changing, addition or deletion; data of the changed part before and after update; data deleted or added; and line number specifying the changed part. The created difference data is input from the difference data extracting part 180 to the update information creating part 190. When the document data is not updated, the difference data extracting part 180 may output blank difference data or notify the update information creating part 190 of the fact that the difference data is not created.

Then in step S706, the update information creating part 190 creates the update information notification based on the difference data extracted in step S705. The update information notification may be created by template, which may be different according to the document of the update notification object or the notified party to be notified. Also, there may be configured at the time of the registration of the notification object document that the user can specify the template to be used.

When the difference data is blank, or when the difference data is not created, the update information creating part 190 may create the update information notification to notify the user of the fact that the update has not been carried out. Alternatively, the process may be concluded without creating the update information notification.

After creating the update information notification in step S706, the update information creating part 190 sends the update information in steps S707 and S708. First in step S707, the update information creating part 190 obtains the notified party from the notification condition storing part 140, and then, in step S708, the update information creating part 190 sends the update information notification to the obtained notified party. Although, as the notified party, an e-mail address is mainly registered and sending the notification can be carried out by e-mail, the sending method is not restricted thereto and there may be carried out by using a communication tool such as facsimile. Or, there may be configured that only the URL of the place which is accessible via the network by the user and where the update information notification is stored is sent by e-mail, etc.

With the above flow of operation, the notification process is repeated until the end of the notification process for all documents to be sent.

There has been described the update information notification process in the electronic document update notification device 100 as above. With such a process, the user can receive the update information even when the document name of the document registered in the electronic document update notification device 100 is changed based on the update date.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

Although there has been described the example of stylizing the document name by the update date and time in the above embodiment, the invention is not restricted to this example. There can be managed by the document name stylized by, for example, regional name or organization name.

Also in the above embodiment, there has been described that the electronic document update notification device is connected to a Web server and a file server with the electronic document stored and to a user terminal used by a user via a network as shown in FIG. 2. The present invention is not restricted to such an example. The electronic document update notification device according to the present invention may be included in, for example, the Web server, the file server or the user terminal.

What is claimed is:

1. An electronic document update notification device having at least one processor for notifying a user of update information of an electronic document, comprising:
   a document name stylizing part for determining a stylized document name based on a notification object document name designated by a user to identify a notification object document, the stylized document name being a predetermined string pattern representing a plurality of different document names;
   a notification condition storing part for storing the stylized document name determined by the document name stylizing part;
   an updated document name generating part operated by an information processor for generating an updated document name including a string specifying a location of the electronic document on a network by obtaining the stylized document name stored in the notification condition storing part, obtaining current date and time information when the predetermined string pattern includes a date and time string pattern, and replacing the date and time string pattern of the predetermined string pattern by the obtained current date and time information;
   a document data obtaining part for obtaining document data after an updating of the document data based on the updated document name;
   a difference extracting part for extracting difference data of a difference between the document data before the updating obtained at the time of a previous update notification and the document data after the updating; and
   an update information creating part for creating an update information notification based on the difference data.

2. The electronic document update notification device according to claim 1, wherein the document name stylizing part determines a stylized document name with a string indicating date and time included in the notification object document name.

3. The electronic document update notification device according to claim 2, wherein the document name stylizing part creates a plurality of stylization candidates for date and time, checks whether there is a part matching any of the stylization candidates in the notification object document name and replaces the matching part by the stylization candidates.

4. The electronic document update notification device according to claim 1, wherein the stylized document name is specified by a user's input.

5. The electronic document update notification device according to claim 4, wherein the update information notification includes both the stylized document name specified by the user and the updated document name.

6. An electronic document update notifying method for notifying a user of update information of an electronic document, comprising:
   a document name stylizing step of determining a stylized document name based on a notification object document name designated by a user to identify a notification object document, the stylized document name being a predetermined string pattern representing a plurality of different document names;
   a notification condition storing step of storing the stylized document name determined by the document name stylizing step;
   an updated document name generating step, performed by an information processor, of generating an updated document name including a string specifying a location of the electronic document on a network by obtaining the stylized document name stored in the notification condition storing step, obtaining current date and time information when the predetermined string pattern includes a date and time string pattern, and replacing the date and time string pattern of the predetermined string pattern by the obtained current date and time information;
   a document data obtaining step of obtaining document data after an updating of the document data based on the updated document name;
   a difference extracting step of extracting difference data of a difference between the document data before the updating obtained at the time of a previous update notification and the document data after the updating;
   an update information creating step of creating an update information notification based on the difference data.

7. The electronic document update notifying method according to claim 6, wherein the document name stylizing step determines a stylized document name with a string indicating date and time included in the notification object document name.

8. The electronic document update notifying method according to claim 7, wherein the document name stylizing step comprises the steps of:
   creating a plurality of stylization candidates for date and time;
   checking whether there is a part matching any of the stylization candidates in the notification object document name; and
   replacing the matching part by the stylization candidates.

9. The electronic document update notifying method according to claim 6, wherein the stylized document name is specified by a user's input.

10. The electronic document update notifying method according to claim 9, wherein the update information notification includes both the stylized document name specified by the user and the updated document name.

* * * * *